United States Patent
Mehnert et al.

(10) Patent No.: US 9,631,948 B2
(45) Date of Patent: Apr. 25, 2017

(54) METHOD AND ARRANGEMENT FOR SYNCHRONIZING A SEGMENT COUNTER WITH A FINE POSITION SENSOR

(71) Applicant: AVAGO TECHNOLOGIES GENERAL IP (SINGAPORE) PTE. LTD., Singapore (SG)

(72) Inventors: Walter Mehnert, Ottobrun (DE); Thomas Theil, Feldafing/Garatshausen (DE)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 14/828,251

(22) Filed: Aug. 17, 2015

(65) Prior Publication Data
US 2015/0354986 A1 Dec. 10, 2015

Related U.S. Application Data

(62) Division of application No. 13/447,251, filed on Apr. 15, 2012, now abandoned.

(51) Int. Cl.
*G01B 7/30* (2006.01)
*G01D 5/14* (2006.01)
*G01D 5/20* (2006.01)

(52) U.S. Cl.
CPC ........... *G01D 5/145* (2013.01); *G01D 5/2046* (2013.01)

(58) Field of Classification Search
CPC ........... G01D 5/14; G01P 3/4815; G01P 3/54
USPC .......... 324/207.13, 207.15, 207.2, 207.21, 324/207.25; 73/514.31
See application file for complete search history.

(56) References Cited

U.S. PATENT DOCUMENTS

| 3,602,906 A | 8/1971 | Wiegand |
| 3,780,313 A | 12/1973 | Wiegand |
| 3,820,090 A | 6/1974 | Wiegand |

(Continued)

FOREIGN PATENT DOCUMENTS

| CN | 1739031 | 2/2006 |
| CN | 101821591 | 9/2010 |

(Continued)

OTHER PUBLICATIONS

European Patent Office, European Extended Search Report, Aug. 10, 2012, pp. 1-9, Patent Application No. 12162362.3, Applicant: Dr. Walter Mehnert et al, Munich, Germany.

(Continued)

*Primary Examiner* — Jay Patidar
(74) *Attorney, Agent, or Firm* — Sheridan Ross P.C.

(57) ABSTRACT

A method and an arrangement for performing the method for the error-free conversion of the counting values of a segment counter including Wiegand sensors and the position values of a fine position sensor into a total position value using the last magnetization direction of the Wiegand wire of a segment counter as part of the information for an absolute synchronization of counting and position values. The method further includes detecting a magnetization direction of the Wiegand wire on the basis of a combination of the magnetization direction, the last stored counting value of the segment counter, and information of the fine position sensor about the current.

20 Claims, 6 Drawing Sheets (56) References Cited

U.S. PATENT DOCUMENTS

| | | | |
|---|---|---|---|
| 6,084,400 | A | 7/2000 | Steinich et al. |
| 6,612,188 | B2 | 9/2003 | Hamilton |
| 7,559,012 | B2 | 7/2009 | Castleberry et al. |
| 7,598,733 | B2 * | 10/2009 | Mehnert ............ G01D 5/145 324/207.15 |
| 2009/0039872 | A1 | 2/2009 | Fischer |
| 2010/0213927 | A1 | 8/2010 | Mehnert et al. |
| 2011/0184691 | A1 | 7/2011 | Mehnert et al. |

FOREIGN PATENT DOCUMENTS

| | | |
|---|---|---|
| CN | 101999079 | 3/2011 |
| DE | 2308478 C2 | 12/1983 |
| DE | 3408478 C1 | 1/1985 |
| DE | 4407474 C1 | 5/1995 |
| DE | 102005035571 A1 | 2/2007 |
| DE | 102006017865 A1 | 10/2007 |
| DE | 102007039051 A1 | 2/2009 |
| EP | 0484716 A1 | 5/1992 |
| EP | 0724712 B1 | 7/1999 |
| EP | 1565755 B1 | 4/2010 |

OTHER PUBLICATIONS

German Patent Office, German Search Report, Mar. 28, 2012, pp. 1-5, German Serial No. 102011002179.5, Applicant: Mehnert et al, Munich, Germany.

The State Intellectual Property Office of P.R. China, First Notification of Office Action, Sep. 25, 2015, pp. 1-8, Application No. 201210117107.5, Applicant: Mehnert et al.

The State Intellectual Property Office of P.R. China, Translation of First Notification of Office Action, Sep. 25, 2015, pp. 1-11, Application No. 201210117107.5, Applicant: Mehnert et al.

Canadian Intellectual Property Office, Office Action, Sep. 29, 2015, pp. 1-4, Application No. 2774702, Applicant: Theil et al.

* cited by examiner

METHOD AND ARRANGEMENT FOR SYNCHRONIZING A SEGMENT COUNTER WITH A FINE POSITION SENSOR

Applicant claims the benefit of, and priority to, copending U.S. patent application Ser. No. 13/447,251, filed Apr. 15, 2012. U.S. patent application Ser. No. 13/447,251, filed Apr. 15, 2012, is incorporated herein in its entirety by reference hereto.

Applicant claims priority to German Patent Application No. DE 10 2011 002 179.5 filed Apr. 19, 2011 which is incorporated by reference herein its entirety.

The invention relates to methods for synchronizing a segment counter having at least one pulse wire (Wiegand wire) sensor with a fine position sensor for the absolute detection of translational and/or rotational movements of a body, as well as to arrangements for performing said methods.

Pulse and Wiegand wires are ferromagnetic elements that—when formed as Wiegand sensors—each have a sensing coil wound around them. When the magnetic areas that are initially oriented irregularly in the ferromagnetic material—referred to as magnetic or Weiss domains—are exposed to external forces, they will align to form a single domain. Application of an external magnetic field of a certain direction and magnitude will cause this domain to flip, thus generating a voltage pulse in the sensing coil which can be picked up as an output signal. The kinetic energy of the elementary magnets flipping into alignment in the form of a continuous wave in the direction of the external field is sufficiently high to allow electrical energy from the coil associated with the Wiegand sensor not only to be used for a signal pulse but also for an electronic counter including a memory; cf. EP 0 724 712 B1 [0009].

In ferromagnetic materials, the interaction of the magnetic moments of neighbouring atoms of a different magnetization direction is rather powerful which results in the orientation of such moments in the above mentioned Weiss domains which are separated from each other by transition layers referred to as Bloch walls. It is now possible to permanently create a single domain having a uniform magnetization direction, for example by mechanically stretching such a ferromagnetic element to form a wire. If such a domain is placed in an external magnetic field of a certain magnitude and direction, it will not flip in its entirety but its elementary magnets will flip from a certain starting position—preferably one end of a wire—in the direction of the external magnetic field, like a domino-effect. This leads to a re-orientation wave of finite speed within the ferromagnetic element. However, compared to the speed of the exciting magnet, this speed is high which is why this may be referred to as a "flipping" of this domain.

However, the triggering direction of this re-magnetization must not be confused with the actual re-magnetization direction. The triggering direction describes toward which magnetic pole the Weiss regions will "flip". The re-magnetization direction, by contrast, leads to the polarity of the triggering pole of the exciting magnet (north or south) and thus to the magnetization direction of the pulse wire.

The quality of the counting pulses generated by such Wiegand sensors strongly depends on the magnetic field strength previously encountered. An optimum counting pulse can only be obtained if the saturation field strength was achieved in the opposite direction before triggering in one direction of the magnetic field. If this is not accomplished, operation may change from a bipolar to a unipolar mode in which counting pulses will only be able to release sufficient energy in one direction.

The states resulting from this are contradictory to the requirement of absolute position detection by means of position detectors including Wiegand sensors. This is because different possible movements—right/left, forward/backward—may have occurred between the last position detected by a counter associated with a position detector and the current position detected after its coming into operation again, which will distort the measurement result due to a non-optimal counting pulse. Only a further movement of the permanent magnet which generates the magnetic field, which will result in a counting pulse being triggered, will terminate this uncertainty. However, it is not always possible to force such a movement.

Simple segment counters can work flawlessly with this uncertainty which may be of the order of up to two segments. Coupling such a segment counter with a fine position encoder is a different matter, however. In this case, the periodically occurring fine position value must be precisely allocated to a segment in order to ensure a consistent total position value. For this purpose, precise knowledge of the motion sequence between the last event detected by the segment counter and the current position is imperative.

It is for example disclosed in U.S. Pat. No. 7,559,012 B2 to use two Wiegand sensors for designing a direction-independent counter which—in combination with an associated logic—will correct those counting pulses that are non-optimal or missing as a result of the change of direction of the exciting magnetic field. However, such a correction can only be performed after the second counting pulse generated after the missing counting pulse. If the body to be monitored stops moving before this second counting pulse was triggered, though, this will make such a correction impossible and the counting result will still be incorrect or imprecise.

It is the object of the invention to remedy this by providing a novel space- and cost-saving method for correctly synchronizing the values of a Wiegand sensor-based segment counter with the values of a fine position encoder and by providing means for performing this method.

Based on the consideration that even if the last generated pulse had been too weak for a count, the exciting magnet was still run past the Wiegand sensor in such a way since the last counted pulse for the current position that the Wiegand sensor was biased for a new pulse, with the magnetization direction of this bias depending on the path taken by the exciting magnet, the aforementioned object is accomplished according to the present invention in that the information required for an absolute synchronization of the values is extracted from the present magnetization direction of the Wiegand sensor pulse wire which was generated by the last movement.

Such information on the motion history of the magnet that is firmly coupled to the body to be monitored which is required, if not sufficient, for resolving the ambiguity of the counting process is thus contained in the magnetization direction of the pulse wire. This is because the Wiegand sensor pulse wire has magnetic domains which will store the last bias direction. Exploiting the knowledge of this magnetization direction allows a correct and consistent allocation of the rotations and/or segments counted by the position sensing detector. As a result, use of the segment encoder with a fine position encoder will always allow an absolute total position value to be formed from the counting values of the Wiegand sensor and the position values of the fine position sensor. A table not explicitly described herein lists the conditions under which a rotation and/or a segment must be added to or deducted from the Wiegand sensor values stored in a counter.

Error-free conversion of the counting value of the segment counter and of the position value of the fine position encoder so as to obtain a total position value is accomplished in that one piece of the information absolutely required for absolute synchronization is obtained from the magnetization direction of said at least one pulse wire, that the last value of the segment counter is available from the memory and that the current≤half segment is known from the fine position encoder.

According to another feature of the invention, the magnetization direction of the pulse wire can be determined by supplying a defined current to one of the inductor coils surrounding the pulse wire, which will cause the elementary magnets of the pulse wire to flip so that the signal triggered in the respective inductor coil as a function of the magnetization direction of the pulse wire can then be supplied to the evaluation electronics for further processing.

According to another feature of the invention, the magnetization direction characterizing each pulse wire is measured by at least one magnetic field sensitive probe allocated to it.

An arrangement for performing the method according to the invention is characterized according to the invention by a segment counter which has at least one pulse wire sensor, by a position sensor for the fine resolution of the segments as well as by evaluation electronics for supplying current, detecting pulses and forming the total position value.

Advantageous embodiments of the invention are defined in the subclaims.

Further advantages, features and possible applications of the present invention will become obvious from the description which follows, in combination with the embodiments illustrated in the drawings.

Throughout the description, claims and the drawings, such terms and associated reference numerals will be used as are listed in the list of reference numerals below. In the drawings.

Figure 1:
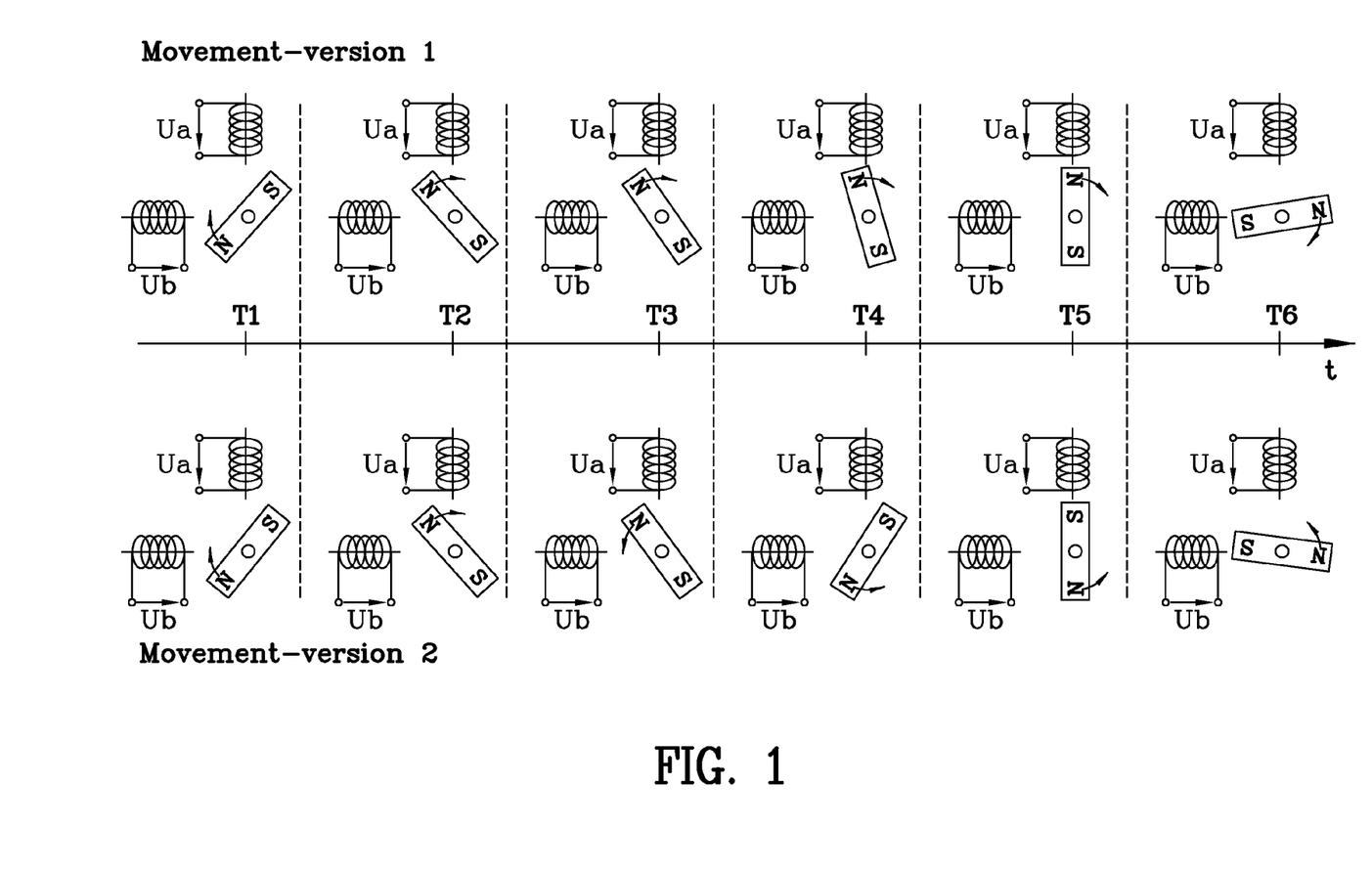
FIG. 1 illustrates versions 1 and 2 of the movement of a segment counter using two Wiegand sensors each.
Figure 4:
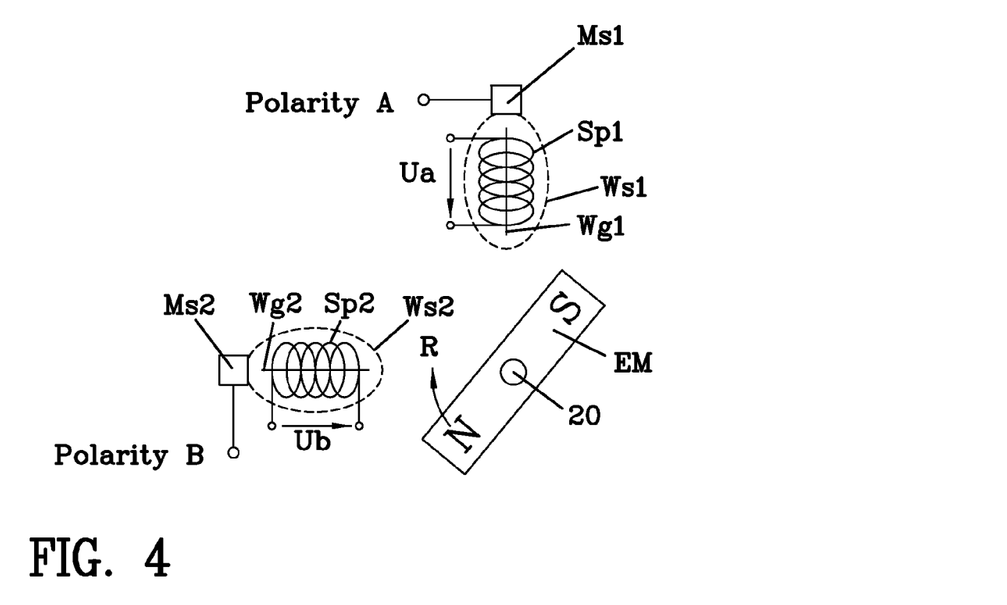
FIG. 4 is a second embodiment of the segment counter for performing the method of the invention with two Wiegand sensors each having one inductor coil and one magnetic field sensitive sensor.

To facilitate understanding of the invention, FIG. 1 shows the movements, i.e. version 1 without reversal of direction and version 2 with reversal of direction, of a segment counter with two Wiegand sensors as illustrated in FIG. 4, in which the changes in position of a permanent magnet EM that is connected to the movement of a rotatable body to be detected and includes the poles N and S are illustrated at times T1 to Tx on time axis t. As is known, the Wiegand sensors include inductor coils SP from which signals in the form of voltage signals Ua/Ub can be picked up.

Figure 2:
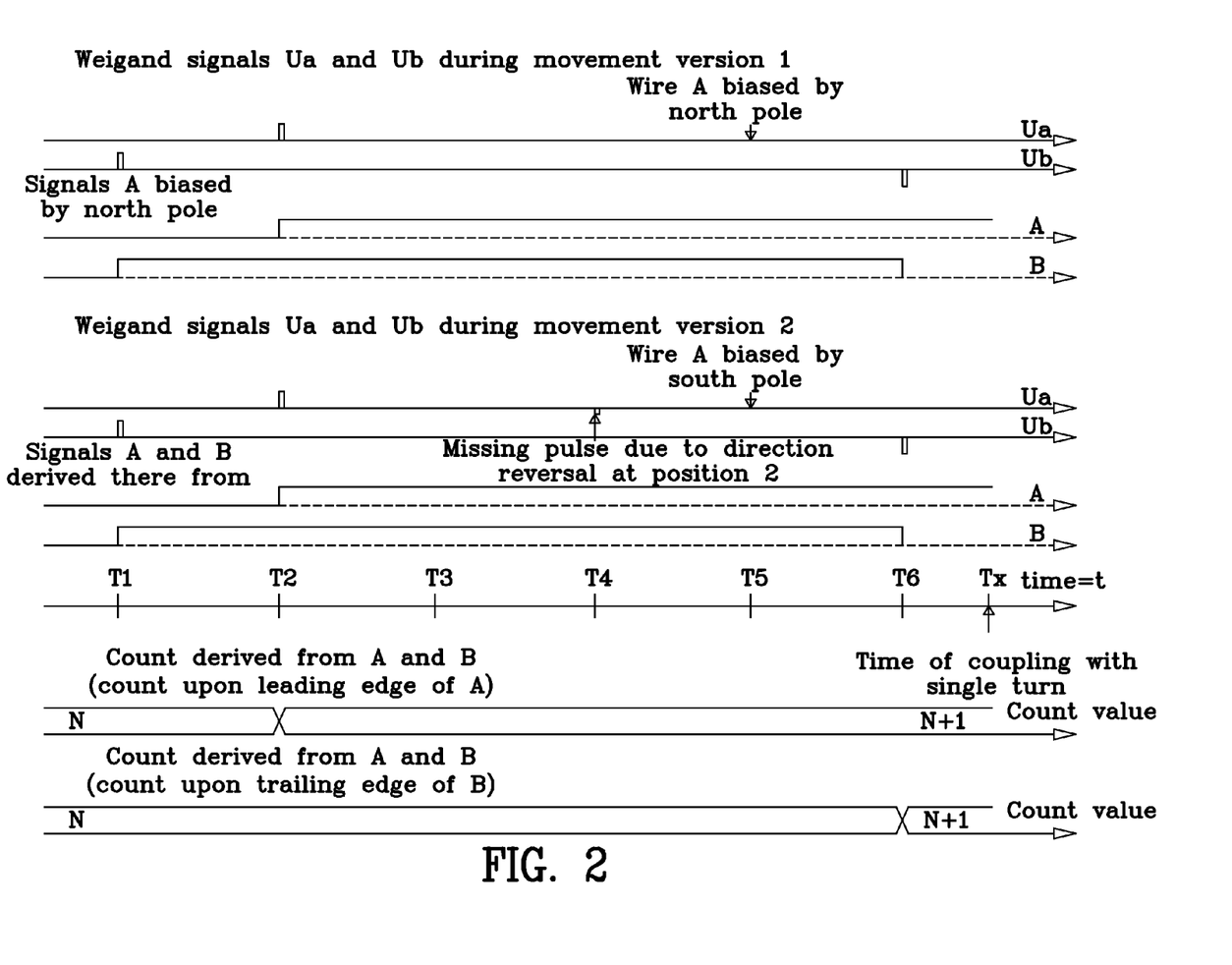
FIG. 2 illustrates the signals from the two Wiegand sensors over time t associated with the movements illustrated in FIG. 1.

FIG. 2 is a schematic view of the associated Wiegand sensor signals Ua and Ub over time t for movement version 1 without direction reversal—no false pulse—and movement version 2—with direction reversal and false signal. Furthermore, it shows the associated signals A and B that have been evaluated for the count as well as the resulting counting value over time t. Two common counting versions are shown there in which the counting is performed either upon entry into the new segment, i.e. on the rising edge of A, or upon leaving the preceding segment, i.e. on the trailing edge of B. In both cases, the count from N to (N+1) has already taken place at time Tx.

As is shown in FIGS. 1 and 2, on the one hand, movement version 1 generates precise Wiegand signals A and B at times T1 to T6 owing to the presence of sufficient magnetic field strengths. On the other hand, however, in movement version 2, owing to the reversal of the direction of rotation of the body to be detected, the bias of the Wiegand wire Wg is insufficient at T3 causing the associated Wiegand pulse to deteriorate at T4 for which reason it cannot be detected. This results in an undesired distortion of the counting value which takes the value (N+1) at Tx in both movement versions, although it should actually be N in movement version 2.

In both versions, a positive pulse at T2 is the last detected and evaluated pulse of Ua, and a negative pulse at T6 is the last detected and evaluated pulse of Ub. The difference in both versions is the magnetic bias of the Wiegand wire Wg at T5, which is known however and used according to the invention. The above mentioned movements diagrams, for the case present here of the final position shown in FIG. 1 (north pole of the magnet EM on the side facing away from sensor B) at time Tx, the information is stored in the counter regarding the current value of A and B so that the counter reading obtained with the Wiegand wire Wg biased by its north pole can be used immediately, whereas the counter reading obtained with the wire Wg biased by its south pole will first have to be decremented by "1" so as to obtain a correct total position value. For all other movement sequences not explicitly illustrated here and the resulting states for A, B, the magnetization directions of the Wiegand wires and the counter reading, respective correction information is stored in the table.

Figure 3:
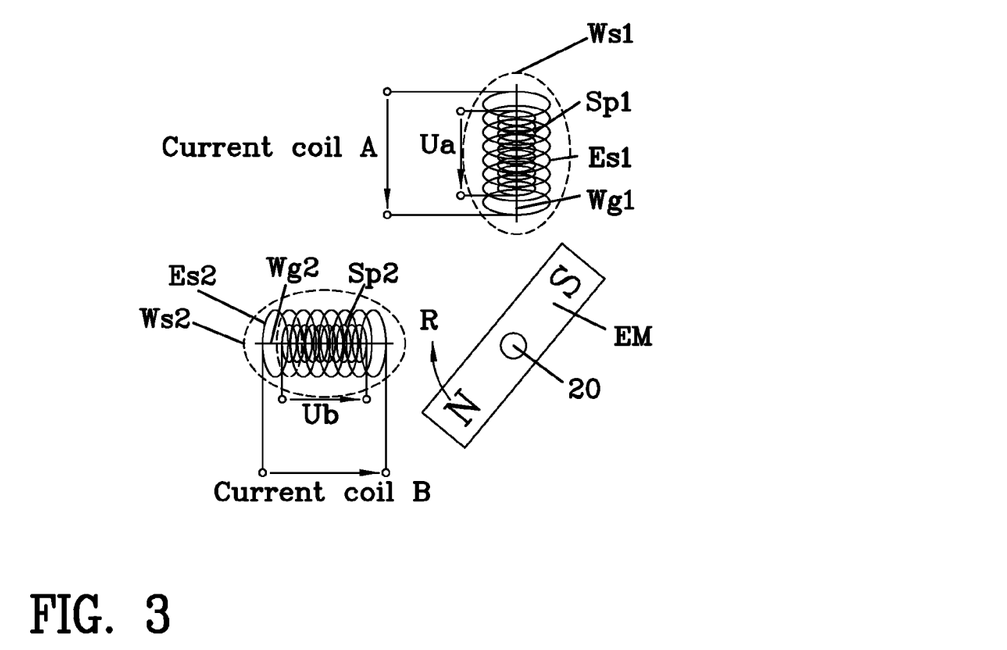
FIG. 3 is a first embodiment of the segment counter for performing the method according to the invention with two Wiegand sensors each having two inductor coils.

FIG. 3 shows a version in which the Wiegand wires Wg1/Wg2 are surrounded by two concentric coils each, of which for example coils Sp1/Sp2 that are close to the wire are used for the response to current supplied to coils Es1/Es2 that are farther away from the wire. An arrangement of two coils mounted next to each other is likewise suitable. For evaluation of the normal pulses triggered by the movement of the magnet, it is possible to use either coil or even both coils together. The current is advantageously supplied in increasing and decreasing ramps, both in order to keep direct cross-coupling between the coils low and to be able to more reliably detect a triggered pulse, e.g. based on the steepness of the edges.

In FIG. 4, a magnetic field sensitive sensor Ms1/Ms2 is used instead of a second coil. This sensor measures the magnetization direction of the respective Wiegand wire Wg1/Wg2 directly.

Figure 5:
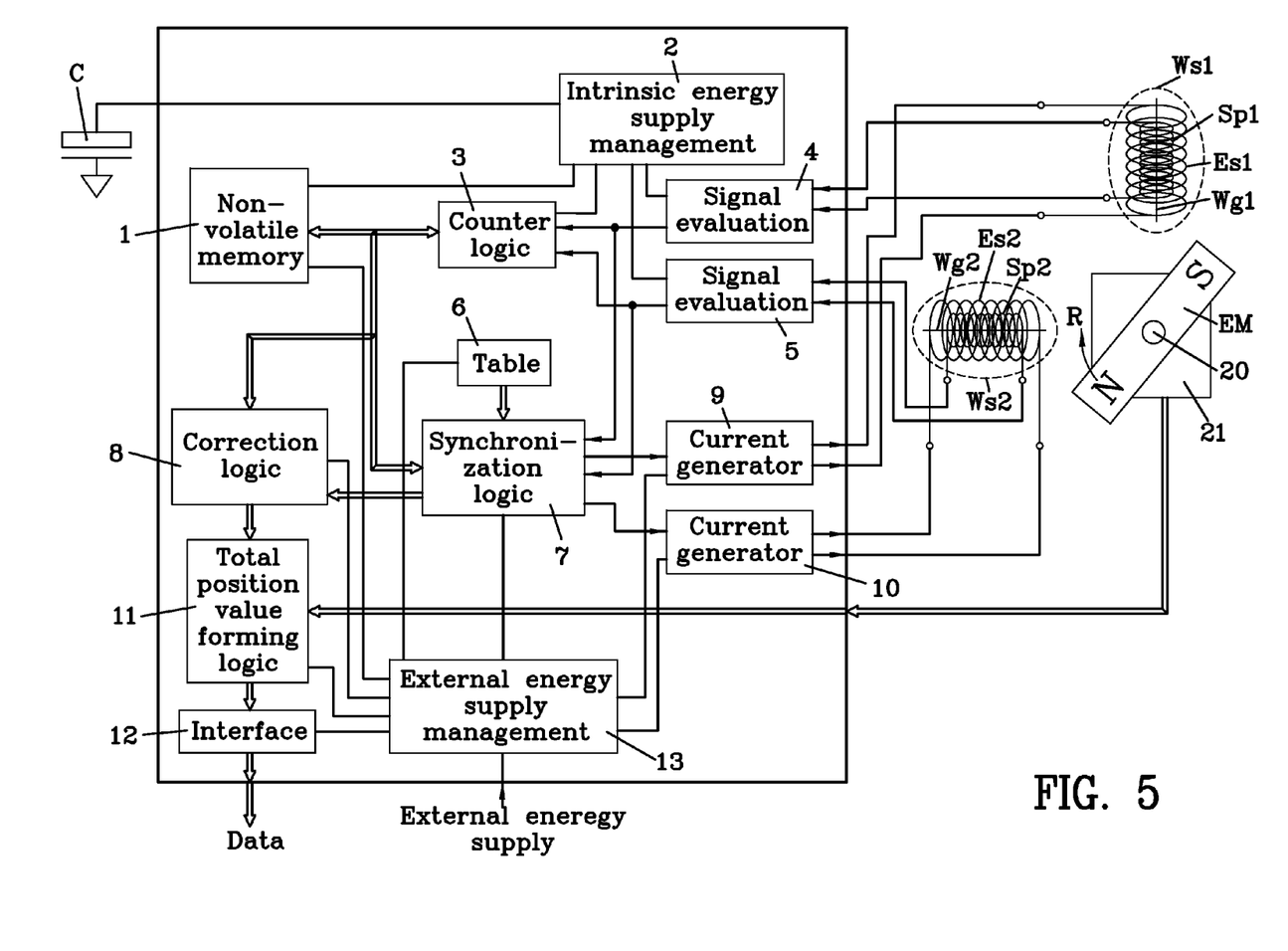
FIG. 5 is a block diagram of the embodiment of FIG. 3.

For evaluating the counting signals of the Wiegand sensors Ws1/Ws2 which form a segment counter and the position values of a fine position encoder 21 for the formation of the respective total position value of a body being moved—i.e. rotated here, for the sake of simplicity—that are connected to the axis of rotation 20 of the body to be monitored, the arrangement shown as a block diagram in FIG. 5 is used for example.

For this purpose, the signal lines of the Wiegand sensors Ws1/Ws2 are connected to a counter logic 3 and a synchronization logic 7 which is fed by a table 6, via signal evaluation circuits 4 and 5. Current is supplied to the inductor coils Es1/Es2 of both Wiegand sensors that are farther away from the wire by means of the current generators 9, 10.

Allocated to the counter logic 3 is a non-volatile memory 1 as well as the correction logic 8 and a logic 11 for linking the counter signals of the Wiegand sensors Ws1/Ws2 and the fine position encoder 21. As is known, the above mentioned circuit elements are powered by the intrinsic energy source 2 and/or by an external energy source 13. The determined total position value can then be picked up via an interface 12. A capacitor C is used to store the energy generated by the Wiegand sensors.

Figure 6:
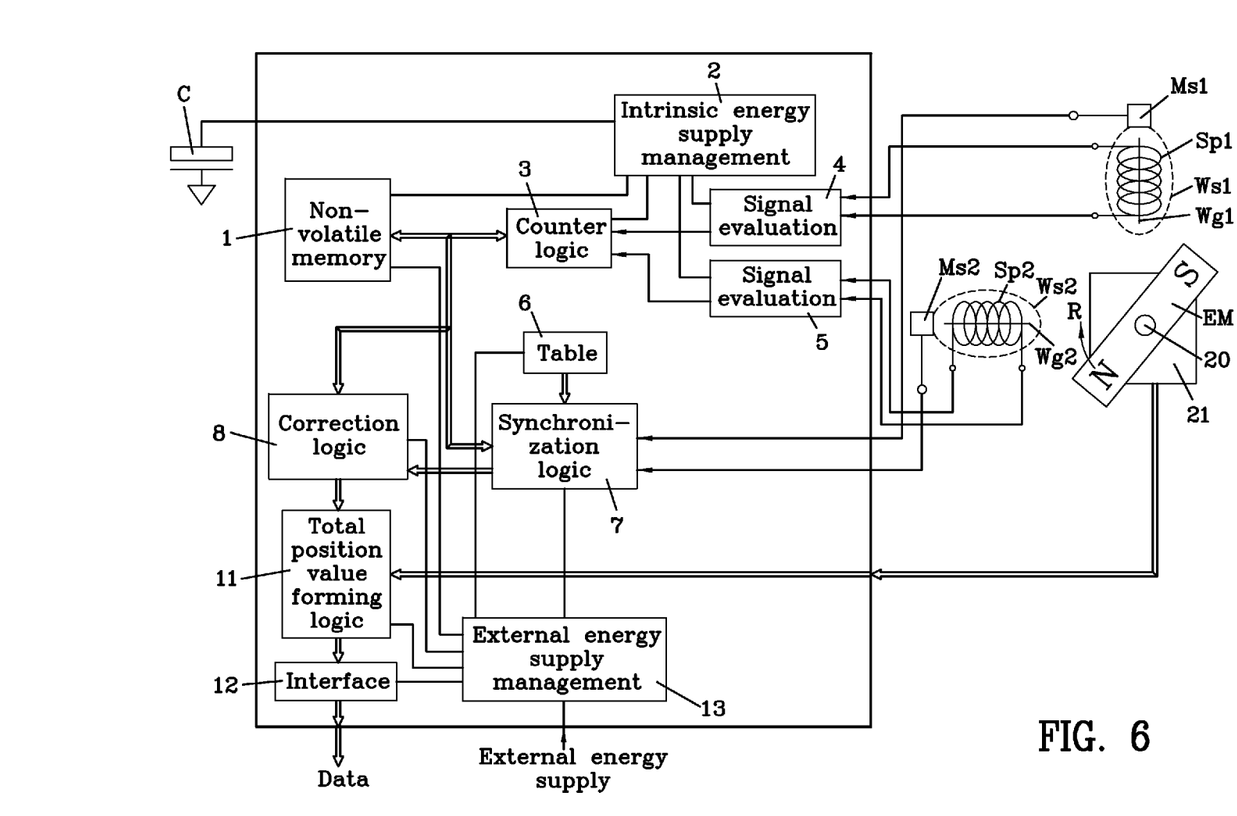
FIG. 6 is a block diagram of the embodiment of FIG. 4.

FIG. 6 illustrates the same type of block diagram for an arrangement of the type shown in FIG. 4. All the circuit elements thus bear the same designations.

Figure 7:
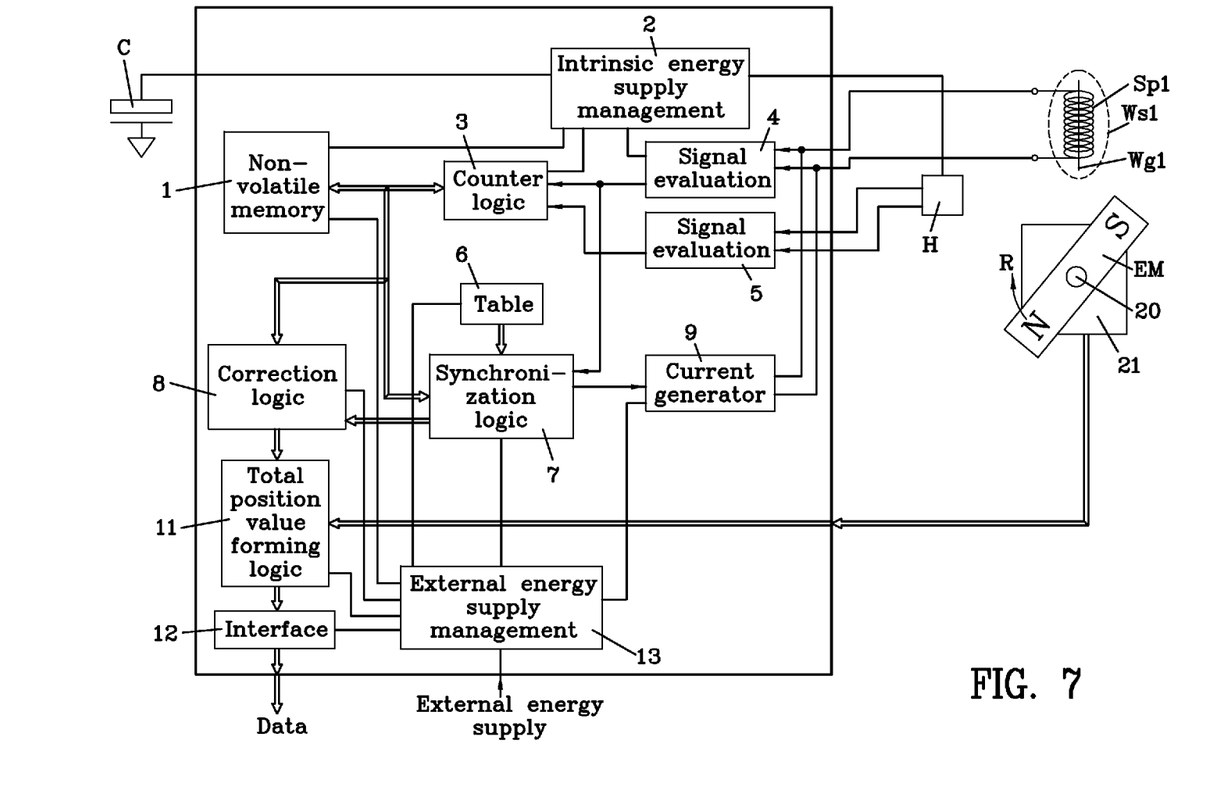
FIG. 7 is a block diagram of an embodiment of the present invention with one Wiegand sensor only.

FIG. 7 shows the arrangement using only one Wiegand sensor (for example according to EP 1 565 755 B1). Here the single coil is used both for pulse evaluation and for supplying an induction current. Differentiating (and thus detecting) a pulse from the voltage signals generated by the current supply is accomplished using techniques commonly used in measurement engineering, for example based on different amplitudes or rising times:

For the fine position sensor 21 of FIGS. 5 to 7, any common and commercially available sensor of the optical, magnetic, capacitive or other type can be used.

All the means according to the invention (FIGS. 5, 6 and 7) have in common that a continuous segment counting value will be stored in the non-volatile memory 1 upon evaluation of the pulses from the Wiegand sensors both in case of an existing external supply voltage and in operation based on an intrinsic energy supply (cf, U.S. Pat. No. 6,612,188 B2 or EP 0 724 712 B1 or EP 1 565 755 B1) using the said signal evaluation circuits 4, 5 and the counter logic 3.

As shown in FIGS. 5 and 7, upon activation of the external supply voltage, the evaluation logic 7 will control the respective current generators 9, 10 and determine a correction value from the Wiegand wire responses, the stored data, the current position of the fine position encoder and the correction table 6. The thus corrected counter reading 8 of the segment counter will subsequently be combined with the values of the fine position encoder in the simple logic 11 to give a total position value, and the latter will then be output via the interface 12. As long as the external supply is ensured, this value will then be updated continuously based on the movement of the body to be monitored and thus corresponds to the required absolute position.

In the device shown in FIG. 6, the initialisation is performed similarly, however, there is no current supply in this case, and the magnetization direction of the Wiegand wires Wg1/Wg2 is gathered directly from the signals of the associated magnetic field sensitive sensors Ms1/Ms2.

Although, for the sake of simplicity, the figures only illustrate arrangements for measuring a rotation, both the method and the means are likewise suitable for measuring a linear movement.

LIST OF REFERENCE NUMERALS 1 non-volatile memory
2 intrinsic energy supply management
3 logic counting circuit
4 signal evaluation
5 signal evaluation
6 table
7 synchronization logic
8 correction logic for counting value
9 current generator
10 current generator
11 total position value forming logic
12 interface
13 external energy supply management
20 shaft
21 fine position encoder
C capacitor for storing intrinsic energy
EM exciting magnet
H Hall probe
Wg1 Wiegand wire
Wg2 Wiegand wire
Sp1 sensing coil
Sp2 sensing coil
Ws1 Wiegand sensor
Ws2 Wiegand sensor
MS1 magnetic field sensitive sensor
MS2 magnetic field sensitive sensor
Es1 exciting coil
Es2 exciting coil
R arrow indicating direction of rotation

The invention claimed is:

1. Method for an error-free conversion of the counting value of a segment counter and of the position value of a fine position sensor to a total position value, wherein said segment counter has at least one Wiegand sensor with a Wiegand wire and wherein the changes in position of a translational and/or rotational movement of an exciting magnet that is firmly coupled to a body to be monitored is detected by said segment counter, wherein a continuous segment counting value of said segment counter is stored in a memory, wherein by said fine position sensor a current segment position of said body to be monitored is detected, wherein a magnetization direction of the Wiegand wire of the Wiegand sensor is detected wherein at a time Tx an examination is made on the basis of a combination of the magnetization direction, the last stored counting value of the segment counter, and information of the fine position sensor about the current segment position, and then it is determined, based on the examination at time Tx, whether the counting value stored in the memory is used immediately or whether the counting value stored in the memory is incremented or decremented.

2. Method of claim 1, wherein determining whether the counting value stored in the memory is used immediately or whether the counting value stored in the memory is incremented or decremented is based on correction information that is read out from a table coupled to the memory, wherein in said table for all movement sequences a respective correction information is stored, wherein said respective correction information is based on Wiegand sensor signals and associated counting signals, the magnetization direction of the Wiegand wire and the last counter reading.

3. Method of claim 2, wherein the magnetization direction of the Wiegand wire is determined, at least in part, by a defined current that is supplied to an inductor coil, which surrounds the Wiegand wire, to determine whether magnets of the Wiegand wire are caused to flip and wherein a response signal, irrespective of the presence of a triggering pulse, is input to evaluation electronics for further processing.

4. Method of claim 3, wherein the Wiegand sensor has a first and a second inductor coil wound around the Wiegand wire of said Wiegand sensor, wherein the current is supplied to said first inductor coil and the response signal is measured in said second inductor coil.

5. Method of claim 3, wherein said Wiegand sensor comprises a single inductor coil wound around the Wiegand wire of said Wiegand sensor, wherein said single inductor coil is used for supplying current and generating the response signal.

6. Method of claim 4, wherein the current supplied to said inductor coil is supplied in increasing or decreasing ramps.

7. Method of claim 1, wherein said magnetization direction of said Wiegand wire is measured by at least one magnetic field sensitive sensor.

8. Method of claim 7, wherein a Hall probe or a GMR sensor is used as said magnetic field sensitive sensor.

9. A method of error-free conversion of a counting value and of a position value to a total position value, the method comprising:
coupling an exciting magnet to a body to be monitored;
providing a Wiegand sensor with a Wiegand wire within proximity to the exciting magnet such that translational and/or rotational movements of the exciting magnet are sensed by the Wiegand wire;
storing a continuous segment counting value in memory, wherein the continuous segment counting value stored in memory corresponds to a counting value made by a segment counter with the Wiegand sensor;
detecting a current segment position of the body with a fine position sensor;
detecting a magnetization direction of the Wiegand wire;
examining, at a time Tx, a combination of the following:
(i) the magnetization direction; (ii) a last stored counting value of the segment counter; and (iii) information of the fine position sensor about current segment position; and
determining, based on the examination at the time Tx, whether the counting value stored in memory is used immediately or whether the counting value stored in memory is incremented or decremented.

10. The method of claim 9, wherein determining whether the counting value stored in the memory is used immediately or whether the counting value stored in memory is incremented or decremented is based on correction information that is read out from a table coupled to the memory.

11. The method of claim 10, wherein movement sequences for a respective correction information are also stored in the table and wherein the respective correction information is based on signals from the Wiegand sensor and associated counting signals as well as the magnetization direction of the Wiegand wire and the last counter reading.

12. The method of claim 11, wherein the magnetization direction of the Wiegand wire is determined, at least in part, by a defined current that is supplied to an inductor coil that surrounds the Wiegand wire.

13. The method of claim 12, wherein the defined current determines whether elementary magnets of the Wiegand wire are caused to flip and wherein a response signals, irrespective of a presence of a triggering pulse, is input to evaluation electronics for further processing.

14. The method of claim 13, wherein the Wiegand sensor has a first and second inductor coil wound around the Wiegand wire of the Wiegand sensor.

15. The method of claim 14, wherein the current is supplied to the first inductor coil and the response signal is measured in the second inductor coil.

16. The method of claim 13, wherein the Wiegand sensor comprises a single inductor coil wound around the Wiegand Wire of the Wiegand sensor.

17. The method of claim 16, wherein the single inductor coil is used for supplying current and generating the response signal.

18. The method of claim 17, wherein the current supplied to the inductor coil is supplied in increasing or decreasing ramps.

19. The method of claim 9, wherein the magnetization direction of the Wiegand wire is measured by at least one magnetic field sensitive sensor.

20. The method of claim 19, wherein the at least one magnetic field sensitive sensor comprises a Hall probe or a GMR sensor.

* * * * *